United States Patent
Etter et al.

(10) Patent No.: US 9,670,572 B2
(45) Date of Patent: *Jun. 6, 2017

(54) METHOD FOR POST-BUILT HEAT TREATMENT OF ADDITIVELY MANUFACTURED COMPONENTS MADE OF GAMMA-PRIME STRENGTHENED SUPERALLOYS

(71) Applicant: ALSTOM Technology Ltd, Baden (CH)

(72) Inventors: Thomas Etter, Muhen (CH); Roman Engeli, Zurich (CH); Andreas Kuenzler, Baden (CH)

(73) Assignee: ANSALDO ENERGIA IP UK LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/705,264

(22) Filed: May 6, 2015

(65) Prior Publication Data
US 2015/0322557 A1 Nov. 12, 2015

(30) Foreign Application Priority Data
May 12, 2014 (EP) .................................... 14167904

(51) Int. Cl.
*C22F 1/10* (2006.01)
*C22C 19/03* (2006.01)
(Continued)

(52) U.S. Cl.
CPC .............. *C22F 1/10* (2013.01); *B22F 3/1055* (2013.01); *B22F 3/15* (2013.01); *B22F 3/16* (2013.01); *B22F 3/24* (2013.01); *C21D 6/00* (2013.01); *C22C 19/03* (2013.01); *C22C 19/07* (2013.01); *B22F 5/009* (2013.01);
(Continued)

(58) Field of Classification Search
CPC ..................................... C22F 1/10; C21D 6/00
See application file for complete search history.

(56) References Cited

U.S. PATENT DOCUMENTS 7,854,064 B2    12/2010  Malley
2013/0228302 A1  9/2013  Rickenbacher et al.

FOREIGN PATENT DOCUMENTS

EP          2586887 A1 *  5/2013

OTHER PUBLICATIONS

L. Rickenbacher et al., "High temperature material properties of IN738LC processed by selective laser melting (SLM) technology", Rapid Prototyping Journal, Jan. 1, 2013, pp. 282-290, XP055109051.

* cited by examiner

*Primary Examiner* — Rebecca Lee
(74) *Attorney, Agent, or Firm* — Buchanan Ingersoll & Rooney PC

(57) ABSTRACT

The invention relates to a method of post-built up heat treatment of an additively manufactured high strength component made of a gamma-prime strengthened superalloy based on Ni or Co or Fe or combinations thereof. An application of a rapid heating-up rate of 25 to 60° C./min in a specific temperature range during the first post-built heat treatment after additive manufacturing avoids or at least minimizes the gamma-prime precipitation in the component during heat-up. This results in crack-free components/articles compared to significant cracking present in conventionally heat treated components.

20 Claims, 5 Drawing Sheets

(51) Int. Cl.
  *C22C 19/07* (2006.01)
  *C21D 6/00* (2006.01)
  *B22F 3/105* (2006.01)
  *B22F 3/15* (2006.01)
  *B22F 3/16* (2006.01)
  *B22F 3/24* (2006.01)
  *B33Y 40/00* (2015.01)
  *B22F 5/00* (2006.01)

(52) U.S. Cl.
  CPC ......... *B22F 2003/248* (2013.01); *B33Y 40/00* (2014.12); *Y02P 10/295* (2015.11)

| Material | Temperature °C | Elongation % | Heat Treatment |
|---|---|---|---|
| IN738LC | 23 | 20.9 | As built |
| IN738LC | 850 | 0.2 | As built |
| CM247LC | 850 | ~0.04 | As built |

FIG. 3

METHOD FOR POST-BUILT HEAT TREATMENT OF ADDITIVELY MANUFACTURED COMPONENTS MADE OF GAMMA-PRIME STRENGTHENED SUPERALLOYS

CROSS-REFERENCE TO RELATED APPLICATIONS

This application claims priority to European application 14167904.3 filed May 12, 2014, the contents of which are hereby incorporated in its entirety.

TECHNICAL FIELD

The present invention relates to the technology of superalloys. It refers to a method for post-built heat treatment of components made of gamma-prime ($\gamma'$) strengthened superalloys and built by additive manufacturing techniques, for example by selective laser melting (SLM). With the disclosed method significant cracking, e.g. strain age cracking, in the components, for example in turbine parts, can be avoided.

BACKGROUND

It is known that high strength nickel, cobalt or iron based superalloys, for example nickel based superalloys with additional elements such as aluminum and titanium, have their high strength characteristics because of the precipitation hardening effect of the high degree of gamma-prime phase in the material. It is also known that those superalloys are very difficult to weld successfully.

SLM-generated articles have different microstructures compared to conventionally cast material of the same alloy. The high energy beam-material interaction in these processes leads to high cooling rates and very fast solidification during SLM.

As a consequence, segregation of alloying elements and formation of precipitates are reduced. Therefore, due to the rapid cooling inherent to the additive manufacturing processes, few to no gamma-prime precipitates are present in the component made of gamma-prime containing alloys after build-up.

Post-built heat treatments are needed to adjust the microstructure of the part and to reduce/eliminate residual stresses. During such post-built heat treatments the gamma-prime phase precipitates during the first heat-up. But the volume changes associated with this precipitation can lead to significant cracking in the part (e.g. strain age cracking). Currently applied heat treatment sequences applied for SLM-processed gamma-prime strengthened superalloys lead to significant cracking and therefore to rejection of parts.

Using different pre- and post-weld heat treatments is known for joining cast components or parts of components made of gamma-prime ($\gamma'$) strengthened superalloys by welding.

U.S. Pat. No. 7,854,064 B2 discloses a process for repair of turbine parts that includes a pre-weld solutioning heat treatment using heating rates between 16-23° C./min in a temperature range between 593-871° C. In one embodiment a slow cooling rate of 0.2-5° C./min from solutioning temperature to below 677° C. is mentioned. In addition, besides the above mentioned pre-weld heat treatment a post weld heat treatment is described using the same heating rate as the pre-weld heat treatment. The process according to this document is applicable to a wide variety of cast and wrought nickel based alloys, for example Waspaloy, IN738, IN792 or IN939. E-beam and tungsten arc welding are mentioned as example processes.

Although the method disclosed in U.S. Pat. No. 7,854,064 B2 has the advantage that turbine components made of Nickel based superalloys could be repaired e.g. welded virtually without the presence of microcracks it has the disadvantage of being time and cost consuming with respect to the described multiple steps of pre-weld and post-weld heat treatment.

The applicant filed a new patent application related to e-beam welding of gamma-prime strengthened superalloys (e.g. IN738LC, MarM247, CM247LC, CMSX-4, MK4HC, MD2) without weld filler recently (not published yet). In contrast to U.S. Pat. No. 7,854,064 this method does not depend on a specific pre-weld heat treatment and thus can be used for repairs as well as for joining new parts. To make the process more efficient a fast heating rate is used in the entire temperature range (rather 1100° C. than 871° C.) close to the final hold temperature, where gamma-prime can precipitate. This method is used only in connection where no other means of crack avoidance exist, i.e. welding processes without weld filler. Using a ductile weld filler could also help avoiding crack formation, however the use of such weld fillers weakens the weld joint.

However, above-mentioned documents cover only joining methods (e.g. welding) and do therefore not cover components entirely made by additive manufacturing, for example by selective laser melting (SLM).

SUMMARY

It is an object of the present invention to provide an efficient method for heat treatment of components made of gamma-prime ($\gamma'$) containing superalloys and built up by additive manufacturing techniques, preferably by SLM. The method shall ensure that crack-free components/articles could be produced compared to significant cracking present in conventionally heat-treated additively manufactured components.

According to independent claim 1 the method for post-built up heat treatment of an additively manufactured component made of a gamma-prime ($\gamma'$) strengthened superalloy based on Ni or Co or Fe or combinations thereof consists of the following steps a) providing the additively manufactured component in the as-built condition, then b) heating the component from room temperature (RT) up to a temperature $T_1$, wherein $T_1$ is 50 to 100° C. less than a temperature $T_s$, at which a drop of the thermal expansion coefficient starts, then c) holding the component for a time $t_1$ at $T_1$ to achieve a uniform component temperature, then d) heating the component by applying a fast heating with a heating rate $v_2$ of at least 25° C./min from $T_1$ to a temperature $T_2 \geq 850°$ C. to avoid or at least to reduce precipitation of the gamma-prime phase, then e) applying further time/temperature steps to the component depending on the purpose of the heat treatment.

The core of the invention is the application of rapid heating-up rate in a specific temperature range during the first post-built heat treatment after additive manufacturing in order to minimize/avoid the gamma-prime precipitation in the component during heat-up. The method results advantageously in crack-free components/articles compared to conventionally heat-treated components that show significant cracks.

In one embodiment in step e) an isothermal dwell $t_2$ for 2 hours is done in order to reduce residual stresses.

Preferably, the heating rate $v_2$ is from 25 to 60° C./min. The higher rates in this range could be achieved with an inductive heating. The heating rate $v_1$ (in step b)) can be preferably 1-10° C./min.

In a further embodiment of the invention in step e) different or additional hold times at temperatures $T_3 > T_2$ are applied to further reduce residual stresses and/or to recrystallize the microstructure.

It is an advantage when the heat treatment is done under pressure, e.g. during hot isostatic pressing (HIP).

In one embodiment the following post-built heat treatment parameters for a component (for example a stator heat shield) additively manufactured and made of IN 738LC are applied:

$T_1$=400° C.
$v_1$=5° C./min
$t_1$=60 min
$v_2$=35° C./min
$T_2$=1050° C.
$t_2$=2 h
$T_3$=1200° C.
$t_3$=4 h.

Additional embodiments are described below.

BRIEF DESCRIPTION OF THE DRAWINGS

The present invention is now to be explained more closely by means of different embodiments and with reference to the attached drawings.

FIG. 3 shows in addition to FIG. 1 and FIG. 2 tensile mechanical results in the as-built condition for SLM processed IN738LC;

DETAILED DESCRIPTION

Figure 1:
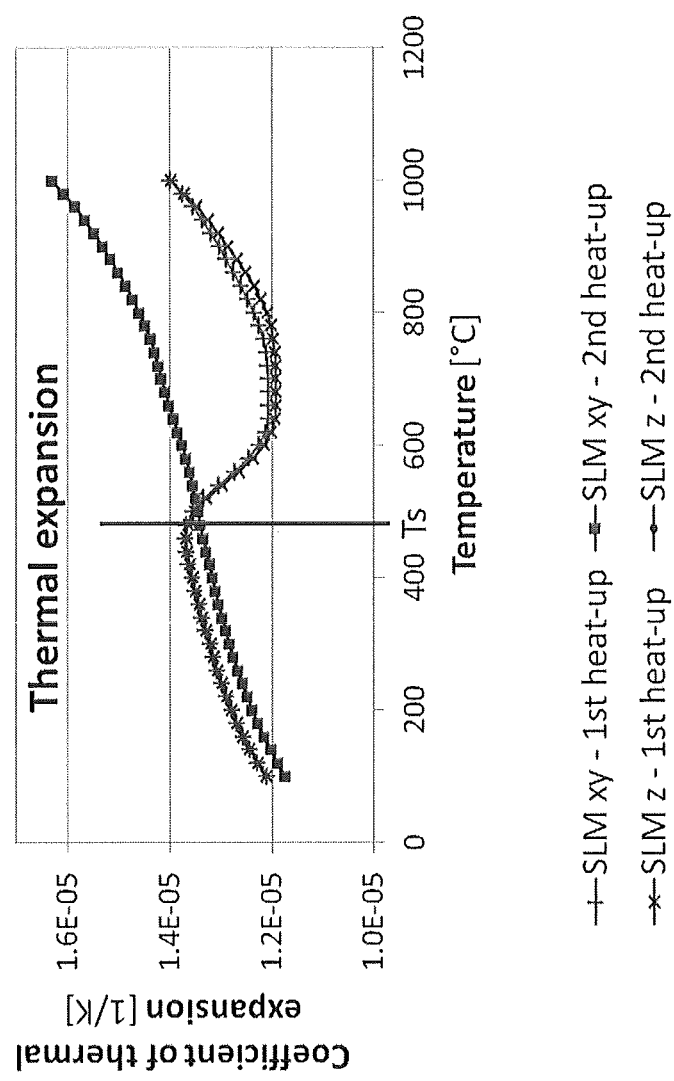
FIG. 1 shows for SLM processed IN738LC the coefficient of thermal expansion dependent on temperature, built-up orientation and a first resp. second heat up.

FIG. 1 shows for SLM processed IN738LC the coefficient of thermal expansion dependent on temperature, built-up orientation and a first resp. second heat up. It can be seen that during the first heating-up, an anomaly (starting above 400° C.) appears in the curve characterized by a drop of the coefficient of the thermal expansion. This anomaly is not present anymore during the second heating-up and can be attributed to the gamma-prime precipitation during first heat-up. The anomaly for the coefficient of thermal expansion indicates a volume contraction due to gamma-prime precipitation.

Figure 2:
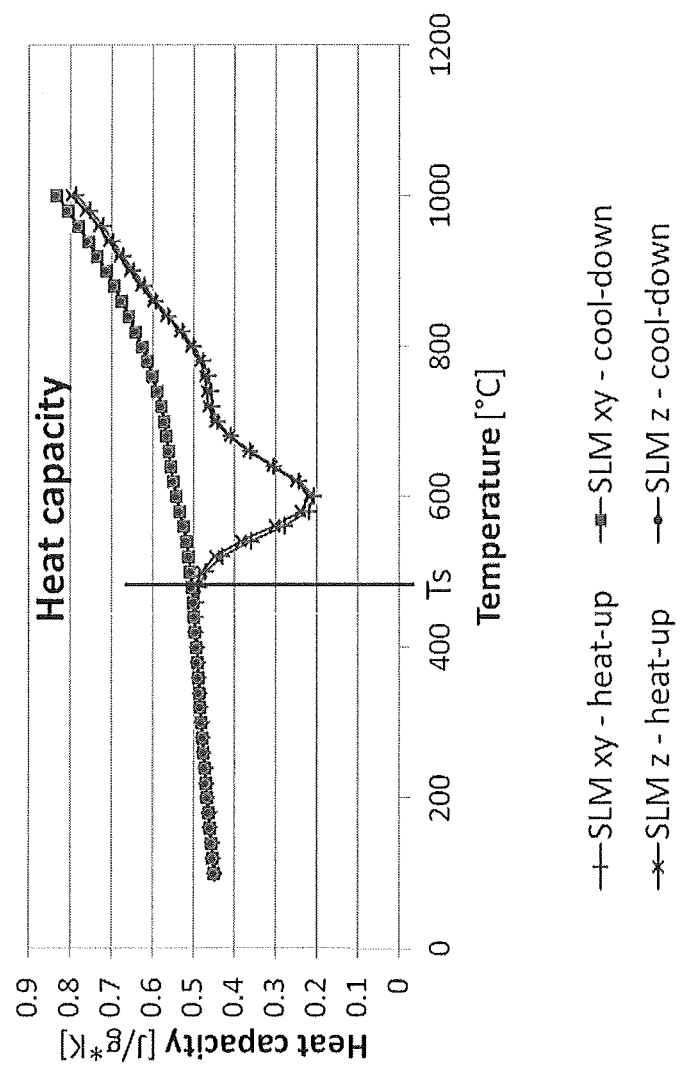
FIG. 2 shows for SLM processed IN738LC the heat capacity dependent on temperature, built-up orientation and a first resp. second heat up.

The same could be seen in FIG. 2, which shows for SLM processed IN738LC the heat capacity dependent on temperature, built-up orientation and a first resp. second heat up.

In addition to thermo-physical properties, tensile mechanical results in the as-built condition (e.g. without any heat treatment) are listed as well (see FIG. 3).

It can be seen, that the ductility at room temperature in the as-built condition for IN738LC is rather high (~20-24%). However, by heating-up a specimen to 850° C. within 2 h (heating rate ~7° C./min) and testing it after 15 min hold time, a significant drop in ductility is observed (from ~20% to ~0.2%!).

The inherent low ductility at elevated temperature during first heat-up and the presence of significant amount of residual stresses due to the SLM process are responsible for a significant cracking.

It is worth mentioning that a comparable low ductility is observed for another gamma-prime strengthened superalloy CM247LC tested in the as-built condition at 850° C.

Figure 4:
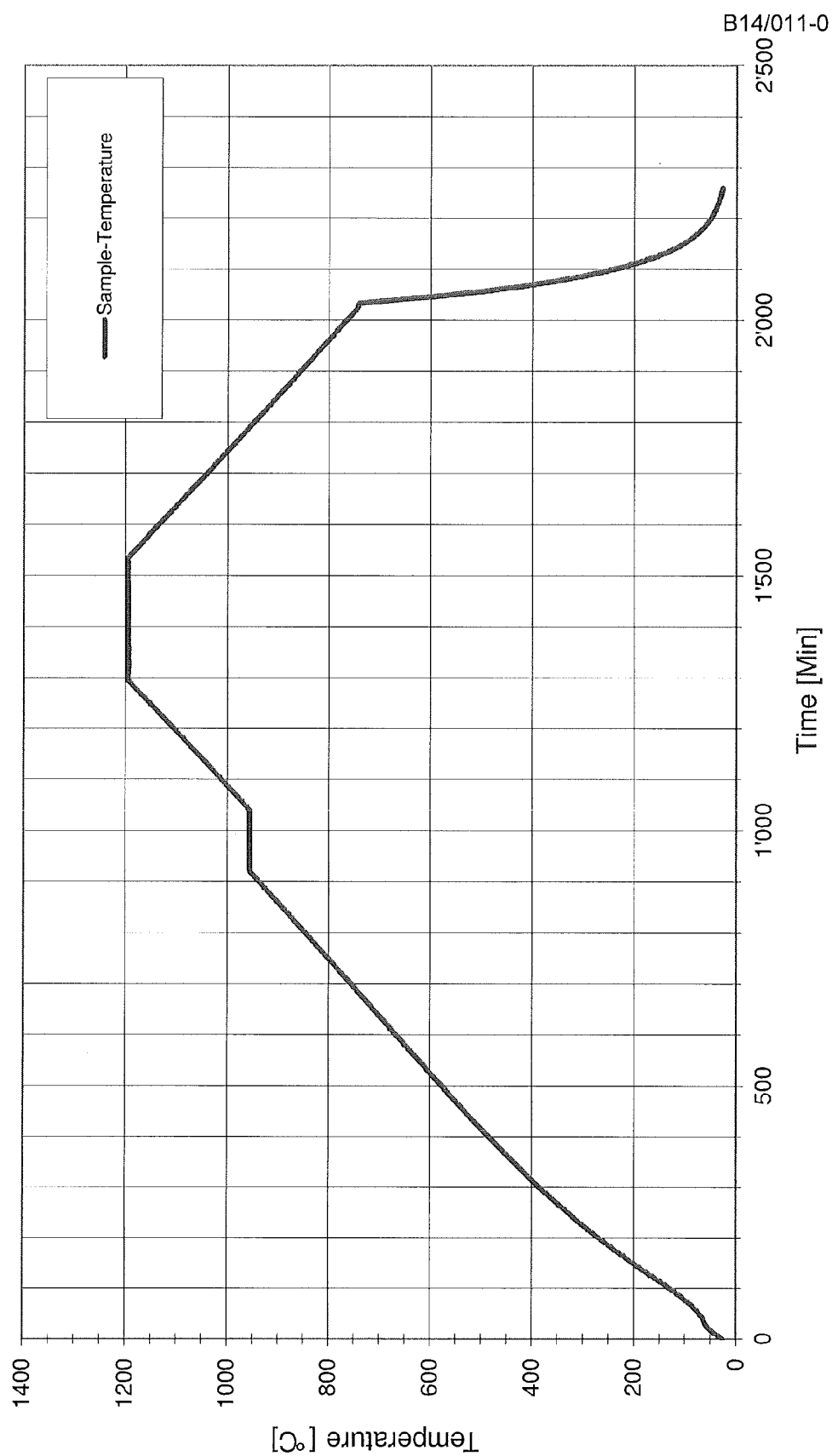
FIG. 4 shows the time-temperature-diagram for a standard heat treatment procedure for SLM processed IN738LC according to the prior art.

FIG. 4 shows a standard heat treatment procedure (e.g. stress relieve heat treatment) for a component made of cast or wrought IN738LC known from the prior art. Such standard heat treatment was applied to a SLM-made IN738LC component. Unfortunately, the component had significant cracks after such a heat treatment and was therefore a deficient product.

Similar results have been obtained for other standard heat treatment procedures usually applied for gamma-prime strengthened superalloys.

In contrast, applying a heat treatment according to the present inventions leads to a corresponding crack-free component, respectively.

Figure 5:
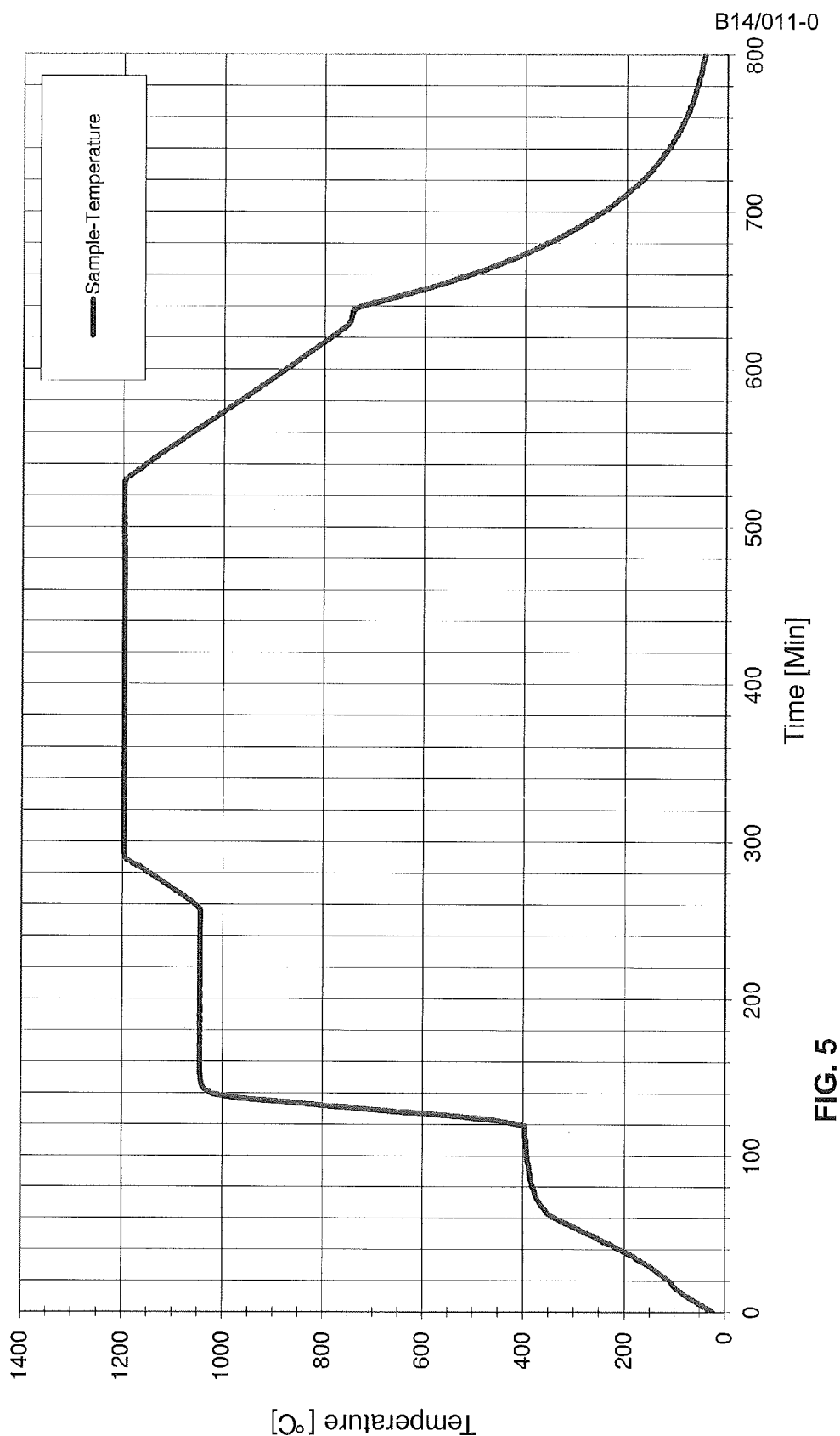
FIG. 5 shows the time-temperature-diagram according to an embodiment of the invention for SLM processed IN738LC.

FIG. 5 shows the time-temperature-diagram according to an embodiment of the invention for IN738LC. The component is heated up to ~400° C. (=$T_1$) with a rather low heating rate $v_1$=5° C./min and a hold time $t_1$=60 min which is long enough to guarantee uniform component/part temperature. Next, the key idea is now a fast heating with $v_2$=35° C./min from 400° C. to ~1050° C. through the critical temperature region to avoid/reduce the precipitation of gamma prime.

Once the critical temperature region has been passed, different further time/temperature steps can be appended depending on the purpose of the heat treatment. In the example according to FIG. 5, an isothermal dwell at $T_3$=1050° C. was done for 2 hours ($t_3$) in order to reduce residual stresses. Different or additional hold times may be added at higher temperatures, e.g. to further reduce residual stresses and/or to recrystallise the microstructure. For example, a treatment with 1250° C./3 h or 1200° C./4 h leads to recrystallisation.

Even a higher heating-up rate may be beneficial for alloys containing higher amount of gamma-prime than IN738LC, such as CM247LC and CMSX-4 for instance. In addition, the isothermal dwell temperature can be increased as well, depending on the solution temperature of corresponding alloys.

The described heat treatment according to the invention must be the first heat treatment applied after SLM built-up. It can be applied to SLM components which are already removed from the base plate, which are built on existing parts (hybrid build-up) or which are still on the base plate. In the latter two cases, the heat treatment additionally helps avoiding cracking caused by different coefficients of thermal expansion, which may create additional stresses during heat treatment, by avoiding the reduction of the ductility caused by the precipitation of gamma prime.

Furthermore, it is worth mentioning that the heat treatment described above can also be done under pressure, e.g. during hot isostatic pressing (HIP) which has additional advantages.

The heating rate $v_2$ is preferably from 25 to 60° C./min. The higher rates could be achieved with an inductive heating.

Once a first heat treatment has been done according to this invention, other standard heat treatments can be applied.

Of course, the invention is not limited to the described embodiments. It could be used for all components where gamma-prime superalloys will be processed by SLM, for example hybrid parts in gas turbines/modular parts for service.

The invention claimed is:

1. A method for post-built up heat treatment of an additively manufactured component made of a gamma prime strengthened superalloy based on Ni or Co or Fe or combinations thereof, the method comprising:
   a) providing the additively manufactured component in an as-built, then
   b) heating the component from room temperature (RT) up to a first temperature $T_1$ at a first heating rate $v_1$, wherein $T_1$ is 50° C. to 100° C. less than a temperature $T_s$, at which a drop of a coefficient of thermal expansion starts, then
   c) holding the component for a first time $t_1$ at $T_1$ to achieve a uniform component temperature, then
   d) heating the component by applying a fast heating with a second heating rate $v_2$ of at least 25° C./min from $T_1$ to a second temperature $T_2 \geq 850°$ C. to avoid or at least to reduce precipitation of a gamma-prime phase, then
   e) applying further time/temperature steps to the component depending on a purpose of the heat treatment.

2. The method according to claim 1, wherein in step d) the second heating rate is $v_2$=25° C./min to 60° C./min.

3. The method according to claim 1, wherein in step e) an isothermal dwell time $t_2$ for 2 hours is done in order to reduce residual stresses.

4. The method according to claim 1, wherein in step e) different or additional hold times at third temperatures $T_3$ are applied to further reduce residual stresses and/or to recrystallize a microstructure, wherein each $T_3$ is greater than $T_2$.

5. The method according to claim 1, wherein the method is performed under pressure during hot isostatic pressing (HIP).

6. The method according to claim 1, wherein the following post-built heat treatment parameters for a component additively manufactured and made of IN 738LC:
   $T_1$=400° C.,
   $v_1$=5° C./min,
   $v_2$=35° C./min, and
   $T_2$=1050° C.

7. The method of claim 4, wherein at least one additional hold time of step e) has a second time $t_2$ of two hours and the third temperature $T_3$ for that hold time is 1120° C., 1200° C. or 1250° C.

8. The method of claim 1, wherein step e) comprises:
   heating the component to a third temperature $T_3$ that is greater than or equal to 1120° C. for a second time $t_2$ that is at least two hours.

9. The method of claim 1, wherein $T_2$ is $\geq$1050° C.

10. The method of claim 1, wherein the as-built condition of the component is a condition of the component after the component is formed from selective laser melting (SLM) without the component undergoing any heat treatment after formation of the component via SLM.

11. The method of claim 1, wherein the as-built condition of the component is a condition in which the component had not yet undergone heat treatment.

12. The method of claim 1, wherein the component is a part of a gas turbine.

13. The method of claim 1, wherein the first heating rate is at least 5° C./min and the second heating rate is greater than the first heating rate.

14. The method of claim 1, wherein the gamma prime strengthened superalloy is IN738LC, CM247CL, or CMSX-4.

15. A method of heat treating an additively manufactured component made of a gamma prime strengthened superalloy based on Ni or Co or Fe or combinations thereof, the method comprising:
   heating the component from a first temperature up to a second temperature at a first heating rate, wherein the second temperature is 50° C. to 100° C. less than a temperature at which a drop of a coefficient of thermal expansion starts for the gamma prime strengthened superalloy;
   holding the component for a first time at the second temperature to achieve a uniform component temperature after heating the component from the first temperature to the second temperature via the first heating rate; and
   heating the component by applying a second heating rate of at least 25° C./min from the second temperature to a third temperature to avoid precipitation of a gamma-prime phase for the gamma prime strengthened superalloy, the third temperature being greater than or equal to 850° C.

16. The method of claim 15, comprising:
   after heating of the component to the third temperature by applying the second heating rate, adjusting a temperature of the component from the third temperature to a fourth temperature.

17. The method of claim 16, comprising:
   maintaining the component at the fourth temperature for a pre-selected holding time that is two hours long; and
   wherein the fourth temperature is 1120° C.

18. The method of claim 15, wherein the component is in an as-built condition that has not undergone any heat treatment prior to the heating of the component from the first temperature to the second temperature via the first heating rate.

19. The method of claim 18, wherein the first heating rate is lower than the second heating rate, the second heating rate being between 25° C./min and 60° C./min.

20. The method of claim 18, wherein the second temperature is 400° C. and the third temperature is 1050° C.

* * * * *